US 8,090,946 B2

(12) United States Patent
Li et al.

(10) Patent No.: US 8,090,946 B2
(45) Date of Patent: Jan. 3, 2012

(54) INTER-SYSTEM BINDING METHOD AND APPLICATION BASED ON HARDWARE SECURITY UNIT

(75) Inventors: Xizhe Li, Beijing (CN); Chunhua Wang, Beijing (CN); Xu Wang, Beijing (CN); Song Cheng, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 963 days.

(21) Appl. No.: 11/772,779

(22) Filed: Jul. 2, 2007

(65) Prior Publication Data
US 2008/0126802 A1 May 29, 2008

(30) Foreign Application Priority Data
Jul. 3, 2006 (CN) .......................... 2006 1 0100538

(51) Int. Cl.
*H04L 9/32* (2006.01)

(52) U.S. Cl. .................. 713/168; 713/150; 713/169
(58) Field of Classification Search .................. 713/168, 713/150, 164, 165, 169
See application file for complete search history.

(56) References Cited

U.S. PATENT DOCUMENTS

| | | | | |
|---|---|---|---|---|
| 2005/0235141 | A1* | 10/2005 | Ibrahim et al. | 713/164 |
| 2005/0289343 | A1* | 12/2005 | Tahan | 713/169 |
| 2006/0090070 | A1* | 4/2006 | Bade et al. | 713/164 |

* cited by examiner

*Primary Examiner* — Kim Vu
*Assistant Examiner* — Suman Debnath
(74) *Attorney, Agent, or Firm* — Dickstein Shapiro LLP

(57) ABSTRACT

The present invention discloses an inter-trusted-computing-system binding method based on hardware security unit, comprising steps of: configuring binding requirements for hardware security units of trusted computing systems; exchanging hardware security unit information between the hardware security units of the trusted computing systems to be bound, and checking device validities of the counter-party hardware security unit; and if passing the validation check, it continues to the following steps; otherwise, exiting the binding procedure; respectively verifying whether the binding meets their respective binding requirements by the hardware security units of the trusted computing systems to be bound; and if passing the verification, it continues to the following steps; otherwise, exiting the binding procedure; and respectively storing platform information and hardware security unit binding information by the hardware security units of the trusted computing systems. The present method provides a processing mechanism based on hardware security unit in order to establish trusts between trusted computing systems.

16 Claims, 2 Drawing Sheets

INTER-SYSTEM BINDING METHOD AND APPLICATION BASED ON HARDWARE SECURITY UNIT

BACKGROUND OF THE INVENTION

1. Field of Invention

The present invention relates to trusted calculation technology, and more particularly to an inter-system binding method and application based on hardware security unit.

2. Description of Prior Art

Hardware security unit such as Trusted Platform Module (TPM) generally has the functionalities for securing the uniqueness of user identity, the completeness and the privacy of user's working space; securing the confidentiality/completeness of the stored, processed and transmitted information; and securing the completeness of the hardware environment settings, operation system kernel, service and application programs. As a basis of a secure system, the hardware security unit secures the system to have immunity so as to block the attacks from virus and hacking software. Additionally, as a hardware key module, the hardware security unit saves keys used for encryption inside the chip or encrypts and stores the keys in an external space, instead of saving the keys on a hard disk or other media in plain text as usual, and provides a reliable cryptography service to the system platform and application programs through a hardware security unit software middleware. In this procedure, the key management, data secure encapsulation/de-capsulation and digital signature calculation have very high security.

A device equipped with a hardware security unit may be referred to as a trusted computing system. In the prior specifications and techniques, the functionalities of the hardware security unit are only effective in the device where it is located, and there is no approach for establishing a trusted relationship between different devices having hardware security units based on the hardware security unit. Therefore, there is a need to extend the trusted computing functions to other trusted computing systems.

For example, a user owns two electronic devices, a personal computer (PC) and a mobile phone, both of them having hardware security units mounted thereon. The user stores some privacy files on the PC, and uses a key of the hardware security unit on the PC for encryption and storage. If the user wants to transmit these files to the mobile phone for further processing, then a procedure needs to be performed in which the files are decrypted firstly by inputting a decryption key on the PC. After that, the decrypted files are transmitted to the mobile phone. Finally, the mobile phone uses its hardware security unit to encrypt the received files for storage. In the above procedure, there is no mechanism for dealing with a problem whether the counter-party trusted computing system is trustable or not; meanwhile, since the transmission is performed in plain text, there is a potential security hazard therein; and the user is required to input the keys or passwords during the decryption and encryption, and thus the procedure is troublesome.

There are a lot of other needs for trusted computing extensions, for example, a laptop computer vs. a PC, a mobile phone vs. a PC, a mobile phone vs. a laptop computer, a PC vs. a PC, associations of wireless devices, and so on. However, there is no approach for granting the trusts between systems based on hardware security unit in the prior arts.

SUMMARY OF THE INVENTION

An object of the present invention is to provide an inter-trusted-computing-system binding method based on a hardware security unit, which is capable of providing an approach for granting trusts between trusted computing systems based on the hardware security unit.

According to a aspect of the present invention, there is provided an inter-trusted-computing-system binding method based on a hardware security unit, comprising:

Step 1, configuring binding requirements for hardware security units of trusted computing systems;

Step 2, exchanging hardware security unit information between the hardware security units of the trusted computing systems to be bound, and checking device validities of the counter-party hardware security unit; and if passing the validation check, it continues to the following steps; otherwise, exiting the binding procedure;

Step 3, respectively verifying whether the binding meets their respective binding requirements by the hardware security units of the trusted computing systems to be bound; and if passing the verification, it continues to the following steps; otherwise, exiting the binding procedure; and Step 4, respectively storing the counter-party platform information and hardware security unit binding information by the hardware security units of the trusted computing systems.

Preferably, before Step 2 of exchanging hardware security unit information each other, the method further comprises a step of:

respectively generating a pair of asymmetric keys as a public key and exchanging the generated public key by the hardware security units of the trusted computing systems to be bound so that an encrypted pipe is established between the trusted computing systems to be bound.

Preferably, between Steps 3 and 4, the method further comprises a step of:

respectively generating a key and exchanging the key by the hardware security units of the trusted computing systems to be bound so that an encrypted pipe is established between the trusted computing systems to be bound.

According to the above description, the present invention provides the inter-trusted-computing-system binding method based on hardware security unit, in which after the device validation checks and the binding requirement verifications of the hardware security units between the trusted computing systems are met, the hardware security unit information and the platform information of the counter-parties are respectively stored so that a trusted relationship is established between the trusted computing systems. The exchange of the keys and the establishment of the encrypted pipe avoid the potential security hazard due to the plain text transmissions so that the security of the information transmissions between the trusted computing systems is further enhanced.

BRIEF DESCRIPTION OF THE DRAWINGS

The above objects, advantages and features of the present invention will be apparent from the following detailed description on the preferred embodiments taken conjunction with the drawings in which.

DETAILED DESCRIPTION OF PREFERRED EMBODIMENTS

Hereafter the embodiments of the present invention will be described in detail with reference to the figures, and details and functions unnecessary for the invention is omitted in the description in order not to obscure understanding of the invention.

The inter-trusted-computing-system binding method based on hardware security unit according to the embodiment of the present invention will be described in detail in conjunction with the drawings. In the method, owners of the hardware security units firstly configure binding requirements; then device validation check for the hardware security unit and verification whether the binding requirements are met are performed between the trusted computing systems to be bound. If the validation check and binding requirements verification for both of the counter-parties are all successful, the trusted computing systems then respectively store the counter-parties' binding information and platform information in their own hardware security units. The trusted computing systems having established the binding relationships consider the counter-parties to be trustable. Based on such trusts, corresponding security managements and services can be provided.

Figure 1:
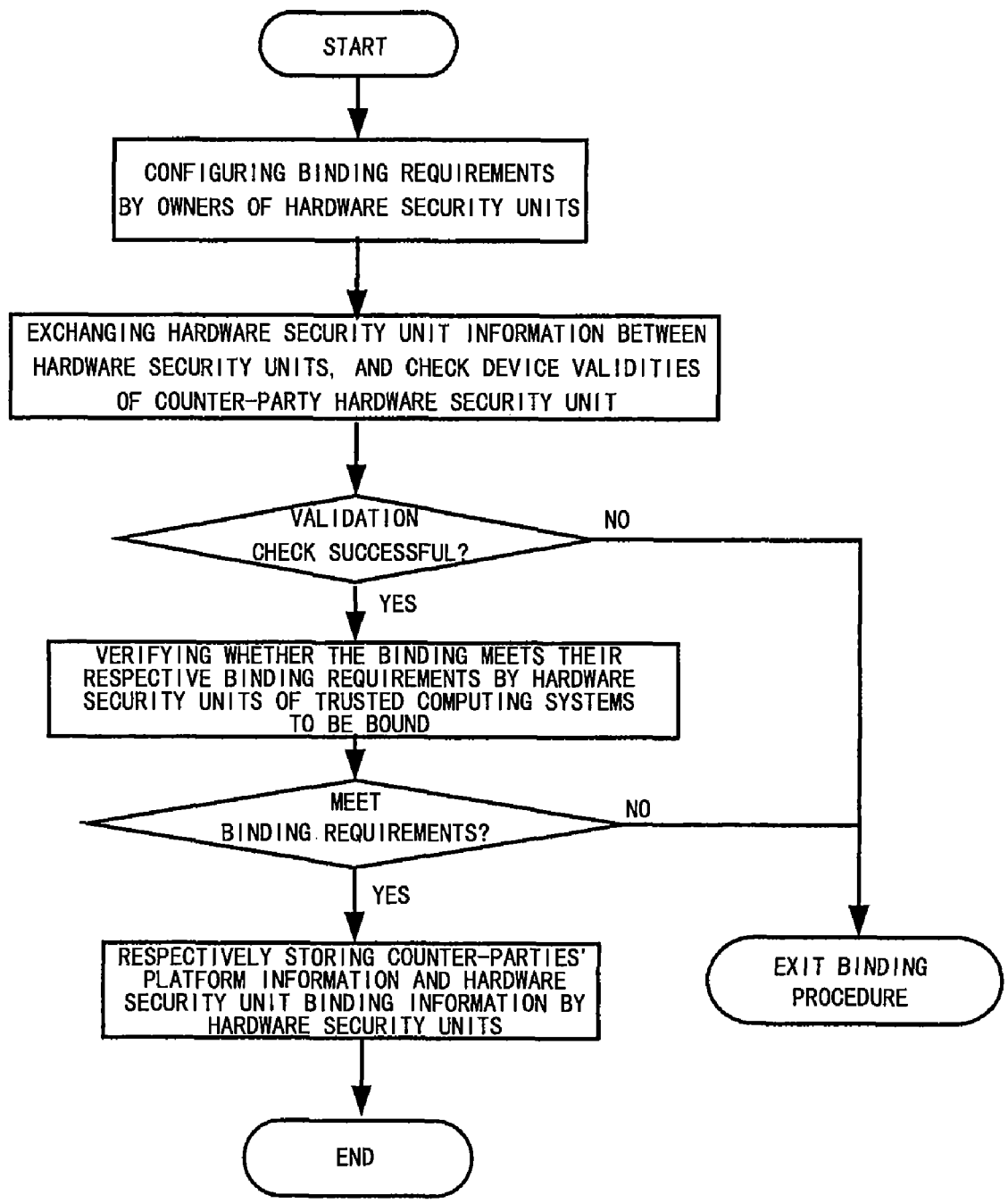
FIG. 1 is a flowchart of an inter-trusted-computing-system binding method based on hardware security unit according to an embodiment of the present invention.

As shown in FIG. 1, the inter-trusted-computing-system binding method based on hardware security unit according to the embodiment of the present invention comprises the following steps.

Step 11, owners of the hardware security units of trusted computing systems configure the binding requirements.

The owners of the hardware security units may configure and mange the binding requirements which can include whether the binding is permitted or not, the type of the hardware security unit which is permitted to be bound, and other conditions must be met by the binding. As the other conditions must be met by the bindings, it can be serial numbers of the hardware security units which are permitted to be bound, or identifiers of the devices where the hardware security units which are permitted to be bound are located. The binding requirements may further include permitted binding modes, whether it can actively initiate a binding or not, whether it can accept a binding request or not, selectable cryptography algorithms for a binding, configurable software and hardware resources and services, and the like.

Step 12, the hardware security unit information is exchanged between the hardware security units of the trusted computing systems to be bound, and device validities of the counter-party hardware security unit are checked.

The trusted computing systems to be bound are connected through communication interfaces such as serial ports, General-Purpose Input Output interface (GPIO), Universal Serial Bus (USB), infrared and wireless and the like. The exchanged hardware security unit information includes IDentification (ID) number, manufacturer descriptor and signature of the hardware security unit. The hardware security unit verifies the device validation of the counter-party hardware security unit by means of completeness checking algorithms. If the check is successful, then it goes to the next step; and otherwise, the binding procedure is ended.

Step 13, the hardware security units of the trusted computing systems to be bound verify whether the binding meets their respective binding requirements.

The hardware security units of the trusted computing systems to be bound exchange user information, hardware security unit information and platform information. The user information includes signature, password of the user or owner, and the like. The hardware security unit information includes interface type, manufacturer descriptor and binding cryptography algorithm of the hardware security unit. The platform information may include hardware information and software information of the trusted computing systems. As an example, for a computer mounted with a hardware security unit, its hardware information includes Basic Input Output System (BIOS) information, CPU information, board card information, hard disk information and the like. Further, its software information includes boot sector information, operation system information and the like. Whereas, for a mobile phone mounted with a hardware security unit, its hardware information generally relates to the information of Read-Only Memory (ROM), CPU, Subscriber Identity Module (SIM) and other associated devices mounted in the trusted computing systems. The hardware security unit checks whether the binding meets the requirements of its own binding requirements, according to the above exchanged information. If the requirements are not met, then the binding procedure is ended; and if the binding requirements are met, it goes to the next step.

Step 14, the inter-trusted-computing-system binding based on hardware security unit is confirmed, the platform information and the hardware security unit binding information of the binding counter-party are stored, and the rights and their applicable ranges are set between the bound hardware security units.

For enhancing the security of the data transmissions during the binding procedure and preventing the data transmitted during the binding procedure to be intercepted, in the mutually bound trusted computing systems, each of the hardware security units firstly generates a pair of asymmetric keys as a public key and exchanges the generated public key so as to establish an encrypted pipe between the trusted computing systems to be bound, and the subsequent data exchanges will be all performed through the encrypted pipe. After exchanging the public keys, the trusted computing systems encrypt the data by the respective hardware security units by using the above exchanged public keys before data transmission. The data encrypted by the public key can only be decrypted by the private key corresponding to the public key, so as to prevent others from obtaining data exchanged during the binding procedure, and thus the security of the binding procedure is enhanced.

In the binding requirements, it can be further set whether the bound hardware security units are in a peer-to-peer relationship or in a non-peer-to-peer relationship. The peer-to-peer relationship defines a peer-to-peer cooperative relationship between the hardware security units, in which one of the hardware security units does not have a control right and a configuration right to the other of the hardware security units. The peer-to-peer bound hardware security units may perform key and service migrations. The non-peer-to-peer relationship defines a master-slave relationship between the hardware security units, and designates one of the hardware security units as a master and the other of the hardware security units as a slave. The master hardware security unit may configure the functions, services, features, software and hardware available resources of the slave hardware security unit, or forcibly perform operations such as clearance, copy and shut-off. The non-peer-to-peer bound hardware security units may also perform key and service migrations.

In a binding requirement, a maximum binding connection number can be provided to indicate the number of the binding connections which meet the binding requirement and are acceptable by the hardware security unit. For example, if the maximum binding connection number is set into 1, then the hardware security unit can establish a binding connection with only one other hardware security unit which meets the binding requirement. If the maximum binding connection number is larger than 1, then the hardware security unit can establish binding connections with a plurality of other hardware security units which meet the binding requirement.

Additionally, in a binding requirement, verification to a binding can be set. The binding relationship between the trusted computing systems can be verified during the period when the relationship exists. The contents to be verified include device validation information, binding requirement information, verification time, and the like. If it is not verified until time-out or the verification is failed, then the binding operation will be terminated. Verification time interval, verification times and verification total duration can be negotiated and determined by the bound hardware security units.

In a binding requirement, a security level of a binding can be set. For different bindings established according to the binding requirements of different security levels, the ranges in which the hardware security unit may use the functions, rights and services of the counter-party hardware security unit are also different.

In a binding requirement, it can be set that signatures, certificates, binding information and platform information stored by the present hardware security unit are not permitted to be distributed to other hardware security units. But it can be also set in a binding requirement that some binding relevant information stored by the present hardware security unit are permitted to be distributed to other hardware security units which have binding relationships with the present hardware security unit. For example, if the owner hopes those binding relationships based on one binding requirement have transitivity, i.e., under one and the same binding requirement, if a hardware security unit A is bound with a hardware security unit B, and the hardware security unit B is also bound with a hardware security unit C, then the binding relationship based on the one and the same binding requirement between the hardware security unit A and the hardware security unit C is also held, thus when the hardware security units A and C establish the binding, the hardware security unit C may provide signature, certificate or binding information of the hardware security unit B to the hardware security unit A for verification. If the verification is successful, then the trusted computing systems where the hardware security units A and C are respectively located may be bound, so as to simplify the verification procedure between the hardware security unit A and the hardware security unit C.

There are a lot of ways to terminate the binding relationships between the trusted computing systems. Firstly, the owner of the hardware security unit is permitted to update or delete the binding requirements. When the binding requirements of one hardware security unit are modified, the previously established binding relationships will be checked according to the new binding requirements, and those not meeting the new binding requirements will be frozen or deleted. Secondly, some constraints which must be met by the bindings can be configured in the binding requirements, such as, binding duration, available times for the binding, and other conditions which must be met by the existence of the binding, for example, keys, variables, indicated number bits, platform information or external information. In one and the same binding requirements, one or more above constraints may be configured. Only when all the configured constraints are met, the corresponding binding may exist. Otherwise, the binding between the trusted computing systems is terminated.

Figure 2:
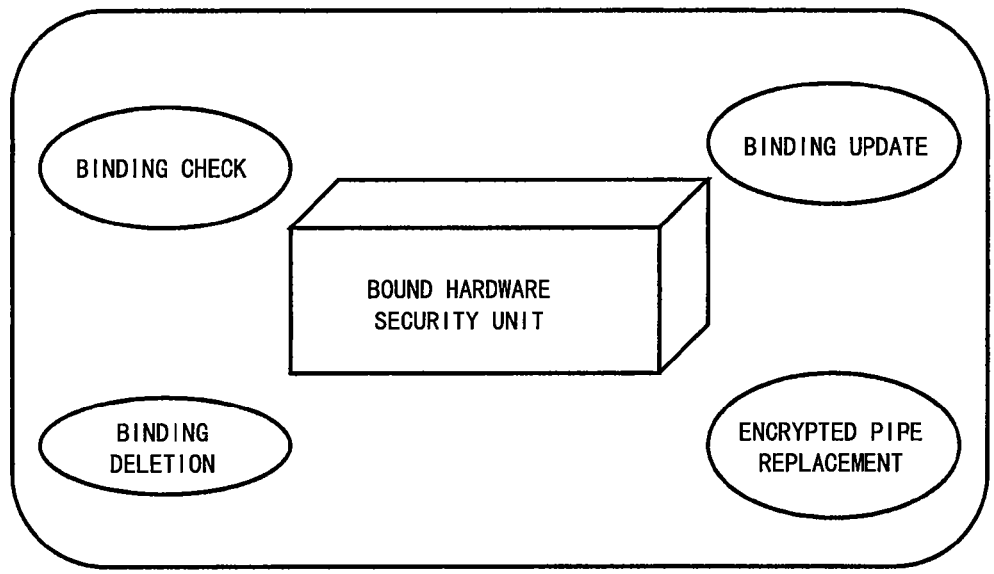
FIG. 2 shows the managements of the hardware security unit to the inter-trusted-computing-system bindings according to the embodiment of the present invention.

As shown in FIG. 2, the managements of the hardware security unit to the inter-trusted-computing-system bindings include binding check, binding update, encrypted pipe update, and binding deletion.

The binding check means that one bound party requests the other party to send up-to-date hardware security unit information and binding information, and compares them with its stored hardware security unit information and binding information of the other party. If there are some differences, the binding is ended and the residual information is cleared.

The binding update means that a part of contents of the binding requirements can be modified between the bound hardware security units. For example, in the non-peer-to-peer relationship, the master hardware security unit may modify the binding requirements of the slave hardware security unit.

The encrypted pipe update means that the bound hardware security units may newly generate new keys and exchange with each other, and all the data to be transmitted thereafter will be encrypted with the new keys so as to generate a new encrypted pipe. At this time, the generated keys may be symmetric keys or asymmetric keys. The algorithm for generating keys may also be re-designated in the binding requirements.

The binding deletion means that the owner of the hardware security unit may delete information on binding records so as to delete the binding between the trusted computing systems.

Figure 3:
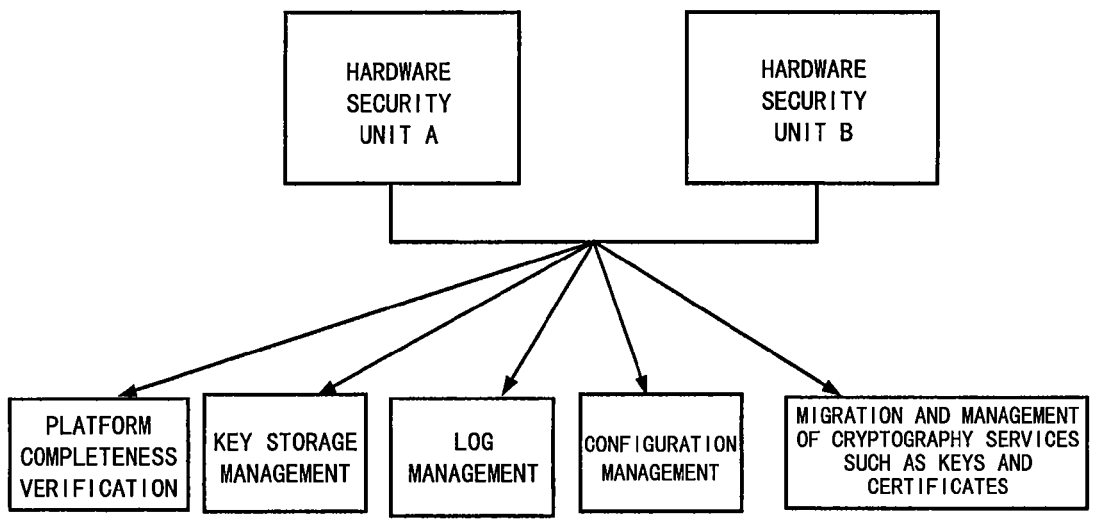
FIG. 3 shows the extended functionalities achieved by the bound hardware security unit according to the embodiment of the present invention.

As shown in FIG. 3, the extended functionalities achieved by the bound hardware security unit include platform completeness verification, configuration management, log management, key storage management, and migration and management of cryptography services such as keys and certificates. The inter-trusted-computing-system binding method based on hardware security unit proposed in the present invention provides the basis of trusts between the bound trusted computing systems so that the security for performing the extended functionalities of these hardware security units is enhanced.

The platform completeness verification means that the hardware security unit verifies the completeness of the system where the counter-party hardware security unit is located. In the aforementioned binding procedure, the hardware security units respectively record platform completeness measurement information or digest thereof stored in Platform Control Register (PCR) of the counter-party hardware security units. When it is required to perform the platform completeness verification, one of the hardware security units sends a request to the other of the hardware security units. The other of the hardware security units performs platform completeness measurement after verifying the reliability of the binding relationship, and returns the corresponding result or digest to the requester of the hardware security units. The requestor of the hardware security units compares the received new platform information with its stored information; and if there are some differences, the counter-party's platform is considered abnormal, and appropriate processes are performed.

The log management means that one of the bound hardware security units saves or acquires relevant logs of the other one, and performs appropriate processes. For example, for a binding-related operation log, the bindings can be managed by analyzing the binding-related operation log.

The key storage management means that before storing a key, one bound hardware security unit A firstly transmits the key to the other bound hardware security unit B for encryption, and then stores the returned key encrypted by the hardware security unit B. When the hardware security unit A needs to use the key, the hardware security unit B firstly performs key decryption, and then the returned key decrypted by the hardware security unit B is used for decryption. Thus, since the key is encrypted by both parties, when using, it must be decrypted by both parties so that the security is enhanced.

The configuration management means that when inter-trusted-computing-system binding based on hardware security unit is in the non-peer-to-peer relationship, the owner of the master hardware security unit may configure the functions, services, features, and software and hardware resources of the slave hardware security unit, as a super user or administrator of the slave hardware security unit, and may control operations such as clearance, copy and shut-off of the slave hardware security unit.

The migration and management of cryptography services such as keys and certificates refer to that the cryptography services such as keys and certificates may migrate between the hardware security units having established the binding relationship. The hardware security unit records the migrations of the keys and certificates, including migration paths, migration location, owner, creator, lifecycle, times for use, rights, and so on, and manages the migrations of the keys and certificates so as to achieve the migration and management of cryptography services. It can be also set whether the migrated keys and certificates are permitted to be further distributed to other hardware security units or not.

In summary, the present invention provides an inter-system binding method based on hardware security unit, for providing a processing mechanism based on hardware security unit in order to establish trusts between trusted computing systems. In the binding procedure, the usage of keys, the device validation check of the hardware security unit and binding requirement verification further enhance the security and reliability of the entire binding method. Through setting the binding requirements, the binding relationships meeting different requirements can be established between the trusted computing systems, and the management of the binding relationships can be achieved. According to the binding method of the present invention, the trustable relationships are established between the trusted computing systems so as to provide the basis and assurance for the multiple extended functions of the hardware security unit.

What is claimed is:

1. An inter-trusted-computing-system binding method based on hardware security unit comprising:
   step 1, configuring binding requirements for hardware security units of trusted computing systems, each trusted computing system having a hardware security unit equipped therewith;
   step 2, exchanging hardware security unit information between the hardware security units of the trusted computing systems to be bound, and checking device validities of the counter-party hardware security unit by use of completeness checking algorithms at both trusted computing systems to be bound;
   step 3, exchanging user information, hardware security unit information and platform information between the hardware security units of the trusted computing systems to be bound, and respectively verifying whether the binding meets their respective binding requirements by the hardware security units of the trusted computing system to be bound according to the exchanged information at both trusted computing systems to be bound, the platform information including hardware information and software information of the trusted computing systems; and
   step 4, respectively storing counter-party platform information and hardware security unit binding information by both hardware security units of the trusted computing systems, wherein said binding requirements further include a security level for indicating a range in which the hardware security unit may use the functions, rights and services of the counter-party bound hardware security unit.

2. The method according to claim 1, wherein before Step 2 of exchanging hardware security unit information, the method further comprises a step of:
   Step 2a, respectively generating a pair of asymmetric keys as a public key and exchanging the generated public key by the hardware security units of the trusted computing systems to be bound so as to establish an encrypted pipe between the trusted computing systems to be bound.

3. The method according to claim 1, wherein between Steps 3 and 4, the method further comprises a step of:
   Step 3b, respectively generating a key and exchanging the key by the hardware security units of the trusted computing systems to be bound so as to establish an encrypted pipe between the trusted computing systems to be bound.

4. The method according to claim 3, wherein the key generated in Step 3b is an asymmetric key, and the exchanged key is a public key; or the key generated and exchanged in Step 3b is a symmetric key.

5. The method according to claim 2, wherein between Steps 3 and 4, the method further comprises a step of:
   Step 3b, respectively generating a key and exchanging the key by the hardware security units of the trusted computing systems to be bound so as to establish an encrypted pipe between the trusted computing systems to be bound.

6. The method according to claim 5, wherein the key generated in Step 3b is an asymmetric key, and the exchanged key is a public key; or the key generated and exchanged in Step 3b is a symmetric key.

7. The method according to claim 1, wherein said binding requirements include whether binding is permitted or not, and/or the type of hardware security unit which is permitted to be bound, and/or serial numbers of hardware security units which are permitted to be bound, and/or identifiers of devices where the hardware security units which are permitted to be bound are located, and/or permitted binding modes, and/or whether it can actively initiate a binding or not, and/or whether it can accept a binding request or not, and/or selectable cryptography algorithms for a binding, and/or configurable software and hardware resources and services.

8. The method according to claim 7, wherein said binding requirements further include a maximum binding connection number respectively for setting the maximum number of binding connections which meet the respective binding requirements.

9. The method according to claim 7, wherein said binding requirements further include a setting of binding verification.

10. The method according to claim 7, wherein said binding requirements further include binding duration, and/or, maximum available time for the binding, and/or, keys or variables or indicated number bits or platform information according to which the binding may exist.

11. The method according to claim 7, wherein said binding requirements further include a setting of whether binding information stored by the hardware security unit is permitted to be distributed to other hardware security units of other systems or not.

12. The method according to claim 2, wherein said binding requirements include whether binding is permitted or not, and/or the type of hardware security unit which is permitted to be bound, and/or serial numbers of hardware security units which are permitted to be bound, and/or identifiers of devices where the hardware security units which are permitted to be bound are located, and/or permitted binding modes, and/or whether it can actively initiate a binding or not, and/or whether it can accept a binding request or not, and/or selectable cryptography algorithms for a binding, and/or configurable software and hardware resources and services.

13. The method according to claim 12, wherein said binding requirements further include a maximum binding connection number respectively for setting the maximum number of binding connections which meet the respective binding requirements.

14. The method according to claim 12, wherein said binding requirements further include a setting of binding verification.

15. The method according to claim 12, wherein said binding requirements further include binding duration, and/or, maximum available time for the binding, and/or, keys or variables or indicated number bits or platform information according to which the binding may exist.

16. The method according to claim 12, wherein said binding requirements further include a setting of whether binding information stored by the hardware security unit is permitted to be distributed to other hardware security units of other systems or not.

* * * * *